United States Patent
He et al.

(10) Patent No.: US 9,483,447 B2
(45) Date of Patent: Nov. 1, 2016

(54) METHOD, DEVICE, AND COMPUTER STORAGE MEDIA FOR ADDING HYPERLINK TO TEXT

(71) Applicant: TENCENT TECHNOLOGY (SHENZHEN) COMPANY LIMITED, Shenzhen, Guangdong (CN)

(72) Inventors: Xiang He, Shenzhen (CN); Qi Bian, Shenzhen (CN); Feng Jiao, Shenzhen (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 144 days.

(21) Appl. No.: 14/349,016

(22) PCT Filed: Feb. 8, 2013

(86) PCT No.: PCT/CN2013/071573
§ 371 (c)(1),
(2) Date: Apr. 1, 2014

(87) PCT Pub. No.: WO2013/143362
PCT Pub. Date: Oct. 3, 2013

(65) Prior Publication Data
US 2014/0250356 A1   Sep. 4, 2014

(30) Foreign Application Priority Data

Mar. 29, 2012 (CN) .......................... 2012 1 0087642

(51) Int. Cl.
*G06F 17/00* (2006.01)
*G06F 17/22* (2006.01)
(Continued)

(52) U.S. Cl.
CPC ......... *G06F 17/2235* (2013.01); *G06F 17/277* (2013.01); *G06F 17/3089* (2013.01); *G06F 17/30882* (2013.01)

(58) Field of Classification Search
CPC ..................... G06F 17/30882; G06F 17/3089
See application file for complete search history.

(56) References Cited

U.S. PATENT DOCUMENTS 5,675,819 A * 10/1997 Schuetze ........... G06F 17/30675
704/10
5,694,594 A * 12/1997 Chang ............... G06F 17/30855
(Continued)

FOREIGN PATENT DOCUMENTS

CN    1801142    7/2006
CN    1801142 A  7/2006
(Continued)

OTHER PUBLICATIONS

Written Opinion from Intellectual Property Office of Singapore (IPOS), mailed on Mar. 3, 2015.

*Primary Examiner* — Keith Bloomquist
(74) *Attorney, Agent, or Firm* — Frommer Lawrence & Haug LLP; William S. Frommer (57) ABSTRACT

Methods and devices for adding hyperlink to text are disclosed: generating hyperlink word list and characteristic word list in advance, determining co-occurrence frequency with each hyperlink word; to each text X which to be added the hyperlink, word segmentation processing them respectively, extracting the hyperlink word occurred in the hyperlink word list and the characteristic word occurred in the characteristic word list from results of word segmentation, determining weights of each extracted hyperlink word and extracted characteristic word, getting final weights of each extracted hypertext link word according to the co-occurrence frequency of each extracted characteristic word and each extracted hyperlink word and the weights; descendingly sorting each extracted hyperlink word according to the final weights, adding hyperlink to first k hyperlink words, and K is positive integer. Applying the solution, it can improve the relativity of the added hyperlink and the text, and it is easy to implement.

10 Claims, 3 Drawing Sheets

(51) Int. Cl.
*G06F 17/30* (2006.01)
*G06F 17/27* (2006.01)

(56) References Cited

U.S. PATENT DOCUMENTS

| | | | | |
|---|---|---|---|---|
| 5,920,859 A * | 7/1999 | Li | ............ | G06F 17/3061 707/711 |
| 7,590,626 B2 * | 9/2009 | Li | ............ | G06F 17/30672 704/238 |
| 7,991,733 B2 * | 8/2011 | Mons | ............ | G06F 17/30731 707/603 |
| 8,150,829 B2 * | 4/2012 | Labrou | ............ | G06F 17/30672 707/706 |
| 8,255,786 B1 * | 8/2012 | Gattani | ............ | G06F 17/30014 715/205 |
| 8,850,301 B1 * | 9/2014 | Rose | ............ | G06F 17/2235 715/208 |
| 2003/0135826 A1 * | 7/2003 | Dozier | ............ | G06F 17/30014 715/206 |
| 2008/0172220 A1 | 7/2008 | Ohshima | | |
| 2008/0222138 A1 * | 9/2008 | Liu | ............ | G06F 17/3089 |
| 2008/0281764 A1 * | 11/2008 | Baxter | ............ | G06K 9/6256 706/12 |
| 2009/0235150 A1 * | 9/2009 | Berry | ............ | G06F 17/30038 715/205 |
| 2011/0047166 A1 * | 2/2011 | Stading | ............ | G06F 17/30637 707/749 |
| 2013/0304684 A1 * | 11/2013 | Yufik | ............ | G06N 3/08 706/20 |

FOREIGN PATENT DOCUMENTS

| | | |
|---|---|---|
| CN | 101000628 | 7/2007 |
| CN | 101000628 A | 7/2007 |

* cited by examiner

The Imperial Palace's construction rests on its layout and the function divides into "the Outer Court" and "the Imperial Palace" two major parts. "The Outer Court" and "the Imperial Palace" is defined by the Gate of Celestial Purity, south of the Gate of Celestial Purity is the Outer Court, and north of the Gate of Celestial Purity is the Imperial Palace. The constructions of the Outer Court and the Imperial Palace of the Imperial Palace are very different. Hall of Supreme Harmony, Hall of Complete Harmony and Hall of Preserving Harmony are the center of the Outer Court which is located on the central axis of the Imperial Palace; the "Hall of Supreme Harmony" is commonly called as "Throne Room", which is place where the emperor holds morning meetings, as known as "Main Hall" which is place where the feudal emperors exercise their power. Moreover, Hall of Literary Glory, Pavilion of Literary Profundity, Infirmary and South Three are located at the east side of the Imperial Palace, and Hall of Martial Valor, Imperial Household Department and other building are located at the west side of the Imperial Palace.

METHOD, DEVICE, AND COMPUTER STORAGE MEDIA FOR ADDING HYPERLINK TO TEXT

CROSS-REFERENCE TO RELATED APPLICATIONS

This application claims the priority benefit of Chinese Patent Application No. 201210087642.0 filed on Mar. 29, 2012, the content of which is incorporated by reference herein in its entirety for all purposes.

FIELD

The present disclosure relates to text processing, technology field, and specifically to a method and a device for adding hyperlink to text.

BACKGROUND

A hyperlink is a reference to a link in the Internet that points to a specific target, which will automatically jump to the specific target by clicking the hyperlink.

Figure 1:
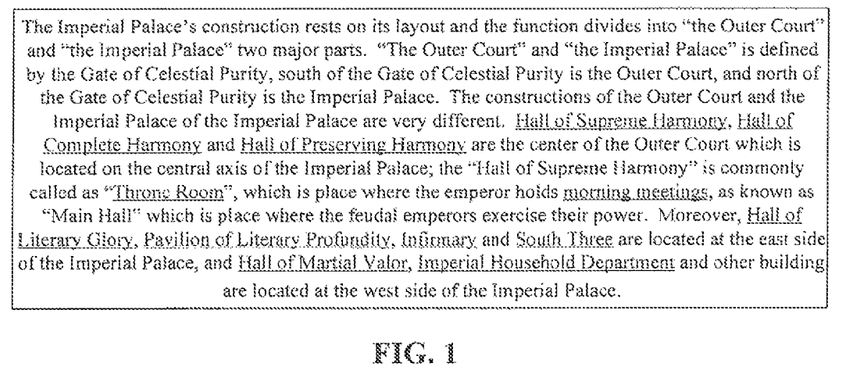
FIG. 1 is a schematic diagram of an existing text adding the hyperlinks.

Different texts are linked together by adding the hyperlinks in the texts. As shown in FIG. 1, FIG. 1 is a schematic diagram of an existing text adding the hyperlinks. In the FIG. 1, certain words such as "Hall of Supreme Harmony", "Hall of Complete Harmony" and "Hall of Preserving Harmony" are added the hyperlinks. In practical applications, the words added the hyperlinks are usually called hyperlink words which are often represented by blue fonts with underlines.

In the prior art, the following methods are generally used to add the hyperlink to the text:

1) to each text to be added the hyperlink, manually determining which words need to be added the hyperlinks;

2) creating a hyperlink word list, and matching texts to be added the hyperlinks with the hyperlink word list, and adding the hyperlinks to the words appearing in the hyperlink word list according the matching results.

However, in practice, the above two methods exist some problems:

to method 1) duo to the need for manual operations, this method is not convenient to achieve, especially adding the hyperlinks to a large number of texts;

to method 2) although this method is relatively easy to realize, but it just only adds the hyperlinks to the matched words, which may result in a lower correlation between the tests and the hyperlinks added to the texts.

SUMMARY

In view of this, a main purpose of present disclosure is providing a method for adding hyperlink to text and a device for adding hyperlink to text, which can improve the correlation between the texts and the hyperlinks added to the texts, and be easy to implement.

In order to achieve the above object, the technology solution of the present disclosure is realized as:

a method for adding hyperlink to text, including:

creating a hyperlink word list in advance, the hyperlink word list comprising a plurality of hyperlink words;

collecting a variety of texts, and generating a characteristic word list by implementing word segmentation processing for each of the texts, the characteristic word list comprising a plurality of characteristic words;

for each of the characteristic words, computing a co-occurrence, frequency between each of the characteristic words and each of the hyperlink words;

considering each text to be added a hyperlink as a text X, and processing the text X by following steps:

carrying out the word segmentation processing to the text X, and obtaining a segmentation result;

extracting the hyperlink words occurred in the hyperlink word list and the characteristic words occurred in the characteristic word list from the segmentation result;

computing a weight of each of the hyperlink words that are occurred in the hyperlink word list, and computing a weight of each of the characteristic words that are occurred in the characteristic word list;

determining a final weight of each of the hyperlink words according to each co-occurrence frequency and the weights of the hyperlink words;

descendingly sorting the hyperlink words occurred in the hyperlink word list according to the final weights of the hyperlink words, and obtaining K numbers of hyperlink words that are arranged in first; and adding hyperlinks for the K numbers of hyperlink words, wherein K is a positive integer.

A device for adding hyperlink to text, includes:

a preprocessing module, configured to create a hyperlink word list in advance, collect a variety of texts, generate a characteristic word list by implementing word segmentation processing for each of the texts, and for each of the characteristic words computer a co-occurrence frequency between each characteristic word list and each hyperlink word, wherein the hyperlink word list comprising a plurality of hyperlink words and the characteristic word list comprising a plurality of characteristic words;

an adding module, configured to consider each text to be added a hyperlink as a text X, and process the text by following steps:

carrying out the word segmentation processing to the text X, and obtaining a segmentation result;

extracting the hyperlink words occurred in the hyperlink word list and the characteristic words occurred in the characteristic word list from the segmentation result;

computing a weight of each of the hyperlink words that are occurred in the hyperlink word list, and computing a weight of each of the characteristic words that are occurred in the characteristic word list;

determining a final weight of each of the hyperlink words according to each co-occurrence frequency and the weights of the hyperlink words;

descendingly sorting the hyperlink words occurred in the hyperlink word list according to the final weights of the hyperlink words, and obtaining K numbers of hyperlink words that are arranged in first; and adding hyperlinks for the K numbers of hyperlink words, wherein, K is a positive integer.

According to the above technical solutions of the present disclosure, by using the embodiments of the present invention, the correlation between the words by counting the co-occurrence relationship between the words of the collected text, and the final weights of each extracted hyperlink word are obtained according to the co-occurrence frequency of each extracted characteristic word and each extracted hyperlink word from the texts to be added the hyperlinks, and the hyperlink words with larger final weight values are added the hyperlinks, thereby increasing the correlation between the texts and the hyperlinks to be added. Moreover, by use of the solution of the present disclosure, it can automatically determine to add the hyperlinks to which words without mar operations, which are easy to implement.

DETAILED DESCRIPTION OF ILLUSTRATED EMBODIMENTS

Embodiment of the present disclosure provides a solution for adding hyperlink to text, which can improve the correlation between texts and hyperlinks added to the texts, and be easy to implement.

Further description of present disclosure will be illustrated, which is combined with embodiments in drawings and detailed embodiments to make the purpose, the technical solutions and the advantages of the present invention more clearly.

Figure 2:
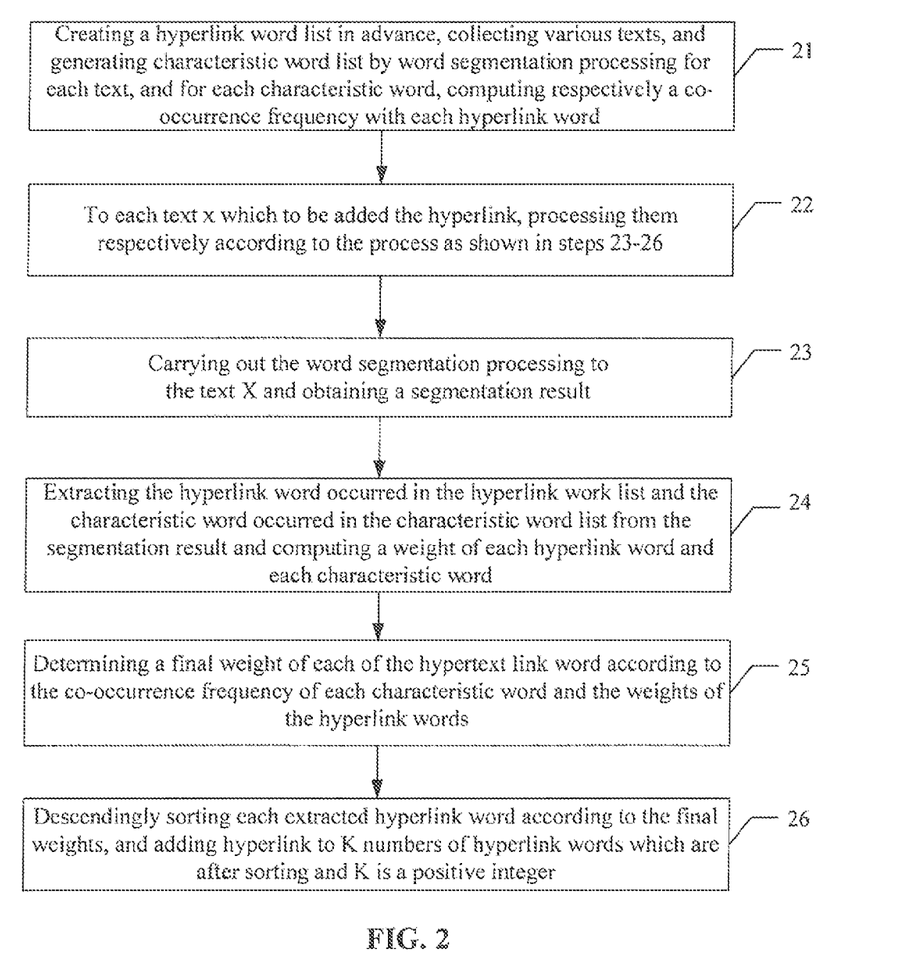
FIG. 2 is a flowchart of a method for adding hyperlink to text provided in one embodiment of the present invention.

Referring to FIG. 2, FIG. 2 is a flowchart of a method for adding hyperlink to text provided in one embodiment of the present invention. As shown in FIG. 2, the method may include steps as below.

In step 21; creating a hyperlink word list in advance and collecting a variety of texts, and generating a characteristic word list by implementing word segmentation processing for each of the texts, and for each of the characteristic words, respectively computing a co-occurrence frequency between each of the characteristic word lists and each of the hyperlink words.

In this step, the hyperlink word list is first generated, and specifically includes hyperlink words which can be determined based on actual need. The hyperlink word list can be generated by the way of manual editing, or also automatically generated by machine; this does not make a specific limit.

The texts can be collected from the Internet to generating the characteristic word list and counting co-occurrence relationship between words. How to collect the texts is an existing technology, in theory, the number of the collected texts is the more the better, and the specific number of the texts can be determined according to the actual needs.

The specific processes of generating the characteristic word list and computing co-occurrence relationship between words may include:

1) carrying out the word segmentation processing for each collected text;

2) extracting all unrepeated words obtained by the word segmentation processing as the characteristic words to form a characteristic word list; or, in order to reduce subsequent processing workload, removing high-frequency words, stop words and low-frequency words from all the unrepeated words obtained by the word segmentation processing, and considering remaining words as the characteristic words to form a characteristic word list; how to segment words and how to distinguish the high-frequency words, the stop words and the low-frequency words from all the unrepeated words are existing technology;

Moreover, after obtaining the characteristic word list, respectively determining IDF (inverse document frequency) value of each characteristic word, the IDF value can be calculated by the following processes: obtaining a quotient by a quantity of the variety of texts collected divided by a quantity of texts appearing the characteristic words, and calculating a logarithm, of the quotient;

3) respectively computing the co-occurrence frequency between each characteristic word and each hyperlink word, specifically including processes:

for each characteristic word y and each hyperlink word x, calculating the co-occurrence frequency $P(x/y)$ using a formula of:

$$P(x/y) = \text{a quantity of } xy \text{ co-occurrences/a quantity } y \text{ occurrences;} \quad (1)$$

wherein, the quantity of xy co-occurrences represents the number of texts appearing the characteristic words y and the hyperlink words x in the same time in all the selected texts; the quantity of y occurrences represents the number of texts appearing the characteristic words y;

or, for each characteristic word y and each hyperlink word x, calculating the co-occurrence frequency $P(x/y)$ using a formula of:

$$P(x/y) = H(x,y)/I(x,y) = H(x,y)/(H(x)+H(y)-H(x,y)); \quad (2)$$

wherein, H represents information entropy; I represents mutual information; the information entropy H is a measure of the uncertainty associated with random variables of the hyperlink word x and the characteristic word y, whose unit is bit, and the mutual information I is a measure of the mutual dependence of two random variables of the hyperlink word x and the characteristic word y, whose unit is bit. The specific calculations of the information entropy H and the mutual information I are known in the art;

in practical applications, any one of the above two ways can be selected according to actual needs.

In step 22: considering each text to be added a hyperlink as a text X, and processing the text X to be added a hyperlink respectively according to the following processes as shown in steps 23-26.

In order to facilitate presentation, the text X is used here to represent any one text which needs to be added the hyperlink.

In step 23: carrying out the word segmentation processing to the text X and obtaining a segmentation result.

In step 24: extracting the hyperlink words occurred in the hyperlink word list and the characteristic words occurred in the characteristic word list from the segmentation results and computing a weight of each of the extracted hyperlink words and each of the extracted characteristic words.

Wherein, the segmentation result of word segmentation is matched with the hyperlink word list and the characteristic word list generated in the step 21, to extract the hyperlink words occurred in the hyperlink word list and the characteristic words occurred in the characteristic word list.

Furthermore, in this step, for each hyperlink word H, the weight WH of the extracted hyperlink word H can be calculated by the following formula (3):

$$WH = TFH * IDFH; \quad (3)$$

wherein, TFH represents TF (term frequency) value of the hyperlink word H, that is, TFH refers to the quantity of the hyperlink word H appearing in the text X, and IDFH represents IDF value of the hyperlink word H.

In his step, for each characteristic word F, the weight WH of the characteristic word F can be calculated by the following formula (4):

$$WF = TFF * IDFF; \quad (4)$$

wherein, TFF represents TF value of the characteristic word F, and IDFF represents IDF value of the characteristic word F.

In the embodiment of the present invention, each IDF value has been figured out in the step 21.

In step 25: determining a final weight of each of the hyperlink words according to each co-occurrence frequency and the weights of the hyperlink words.

In this step, for each hyperlink word H, the final weight WH' of the extracted hyperlink word H can be calculated by the following formula (5):

$$W_{H'} = W_H * \sum_{i=1}^{n} P(H/F_i) * W_{Fi}; \quad (5)$$

wherein, a represents the quantity of the characteristic words.

The value of $P(H/F_i)$ has been calculated in the step 21.

In step 26: descendingly sorting the hyperlink words occurred in the hyperlink word list according to the final weights of the hyperlink words, and obtaining K numbers of hyperlink words that arranged in first, and adding hyperlinks for the K numbers of hyperlink words, wherein, K is a positive integer.

In summary, the description for the method provided in the embodiments of the present invention is completed.

Figure 3:
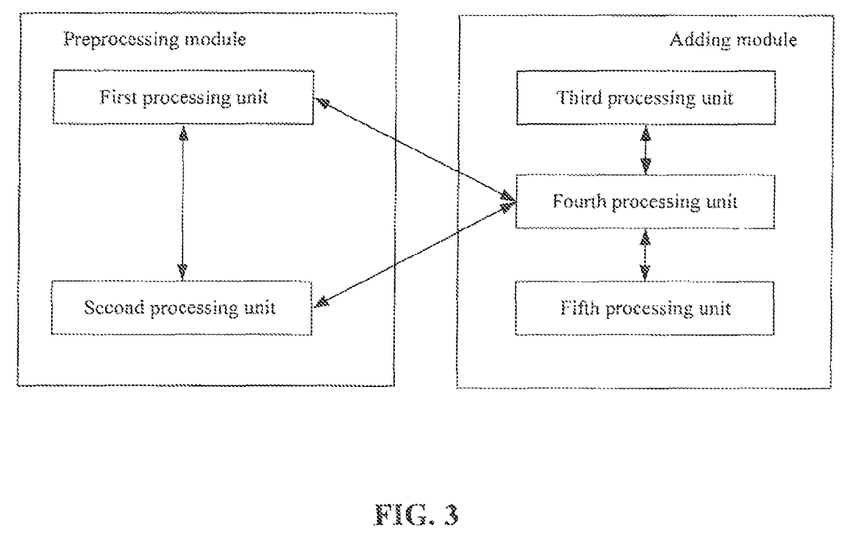
FIG. 3 is a schematic diagram of a device for adding hyperlink to text provided in one embodiment of the present invention.

Based on the above description for the method, referring to FIG. 3, a device for adding hyperlink to text is provided. FIG. 3 is a schematic diagram of a device for adding hyperlink to text provided in one embodiment of the present invention. The device may include: a preprocessing module and an adding module.

The preprocessing module, is capable of creating a hyperlink word list in advance and collecting a variety of texts, and generating a characteristic word list by implementing word segmentation processing for each of the texts, and for each of the characteristic words computing a co-occurrence frequency between each of the characteristic words and each of the hyperlink words.

The adding module, is capable of considering each text to be added a hyperlink as a text X and processing the text X respectively according to the following steps in detail:

carrying out the word segmentation processing to the text X and obtaining segmentation result;

extracting the hyperlink words occurred in the hyperlink word list and the characteristic words occurred in the characteristic word list from the segmentation result and computing a weight of each of the hyperlink words that are occurred in the hyperlink word list, and computing a weight of each of the characteristic words that are occurred in the characteristic word list;

determining a final weight of each hyperlink word according to each co-occurrence frequency and the weights of the hyperlink words; and descendingly sorting the hyperlink words occurred in the hyperlink word list according to the final weights of the hyperlink words, and obtaining K numbers of hyperlink words that are arranged in first, and adding the hyperlinks for the K numbers of hyperlink words, wherein, K is a positive integer.

In the embodiment of the present invention, the preprocessing module may include: a first processing unit and a second processing unit.

The first processing unit, is capable of creating a hyperlink word list.

The second processing unit, is capable of collecting a variety of texts, and generating a characteristic word list by implementing word segmentation processing for each text, and respectively computing the co-occurrence frequency between each characteristic word and each hyperlink word.

The second processing unit can further include: a second processing sub-unit and a second processing sub-unit, which are not shown in FIG. 3 to simplify the drawing.

The first processing sub-unit, is capable of collecting a variety of texts.

The second processing sub-unit, is capable of carrying out the word segmentation processing for each collected text, and extracting all unrepeated words obtained by the word segmentation processing as the characteristic words to form a characteristic word list; or, removing high-frequency words, stop words and low-frequency words from all the unrepeated words obtained by the word segmentation processing, and considering remaining words as the characteristic words to form a characteristic word list;

moreover, for each characteristic word y and each hyperlink word x, calculating the co-occurrence frequency P(x/y) by a formula (1);

$$P(x/y) = \text{a quantity of } xy \text{ co-occurrences/a quantity } y \text{ occurrences} \quad (1)$$

wherein, the quantity of xy co-occurrences represents the number of texts appearing the characteristic words y and the hyperlink words x in the same time in all the selected texts; the quantity of y occurrences represents the number of texts appearing the characteristic words y;

or, for each characteristic word y and each hyperlink word x, calculating the co-occurrence frequency P(x/y) by a formula (2):

$$P(x/y) = H(x,y)/I(x,y) = H(x,y)/(H(x)+H(y)-H(x,y)) \quad (2)$$

wherein, H represents information entropy; I represents mutual information; the information entropy H is a measure of the uncertainty associated with random variables of the hyperlink word x and the characteristic word y, whose unit is bit, and the mutual information I is a measure of the mutual dependence of two random variables of the hyperlink word x and the characteristic word y, whose unit is bit.

The adding module may include: a third processing unit, a fourth processing unit and a fifth processing unit.

The third processing unit, is capable of carrying out the word segmentation processing to the text X and obtaining a segmentation result.

The fourth processing unit, is capable of extracting the hyperlink words occurred in the hyperlink word list and the characteristic words occurred in the characteristic word list from the segmentation result and computing a weight of each of the extracted hyperlink word that are occurred in the hyperlink word list, and computing a weight of each of the extracted characteristic words that are occurred in the characteristic word list, and determining a final weight of each of the hyperlink words according to each co-occurrence frequency and the weights of the hyperlink words.

The fifth processing unit, is capable of descendingly sorting the hyperlink words occurred in the hyperlink word list according to the final weights of the hyperlink words, and obtaining K numbers of hyperlink words that are arranged in first, and adding hyperlinks fix the K numbers of hyperlink words, wherein, K is a positive integer.

Moreover, the second processing sub-unit is further capable of respectively determining an IDF value of each characteristic word, the IDF value can be calculated by the following processes: obtaining a quotient by a quantity of the variety of texts collected divided by a quantity of texts appearing the characteristic words, and calculating a logarithm of the quotient.

The fourth processing unit can further include: a third processing sub-unit and a fourth processing sub-unit, which are not shown in FIG. 3 to simplify the drawing.

The third processing sub-unit, is capable of extract the hyperlink words occurred in the hyperlink word list and the characteristic words occurred in the characteristic word list from the segmentation result.

Furthermore, for each hyperlink word H, the weight WH of the hyperlink word H can be calculated by a following formula (3):

$$WH=TFH*IDFH; \qquad (3)$$

wherein, TFH represents TF (term frequency) value of the hyperlink word H, that is, TFH, refers to the quantity of the hyperlink word H appearing in the text X, and IDFH represents IDF value of the hyperlink word H.

For each characteristic word F, the weight WH of the characteristic word F can be calculated by a following formula (4):

$$WF=TFF*IDFF; \qquad (4)$$

wherein, TFF represents TF value of the characteristic word F, and IDFF represents IDF value of the characteristic word F.

The fourth processing sub-unit, is capable of for each hyped ink word H, calculating the final weight WH' of the hyperlink word H by a following formula (5):

$$W_{H'} = W_H * \sum_{i=1}^{n} P(H/F_i) * W_{Fi}; \qquad (5)$$

wherein, n represents the quantity of the extracted characteristic words.

The specific workflow of the device provided in the embodiment of FIG. 3 can be found in the method provided in the embodiment of FIG. 2, which is not repeated here.

The present disclosure further provides a computer readable storage media, storing one or more programs for execution by one or more processors of a computer having a display, the one or more programs comprising instructions for executing the method for adding hyperlink to text by a machine. Specifically, a system or a device configured with the storage media can be provided, and the storage media stores software program codes which can execute and realize the function of any embodiment of the above embodiments, and computers (such as CPUs or MPUs) of the system or the device read and execute the program codes stored in the storage media.

In this case, the program codes stored in the storage media themselves can execute and realize the function of any embodiment of the above embodiments, therefore, the program codes and the storage media including the program codes constitute one part of the present disclosure.

Embodiments of the storage media for supplying the program codes include: a floppy disk, a hard disk, a CD (compact disc) (such as, CD-ROM, CD-R, CD-RW, DVD-ROM, DVD-RAM, DVD-RW, DVD+RW), a magnetic tape, a non-volatile memory card and ROM. Alternatively, the program codes can be downloaded from server computers by a communication network.

Furthermore, it should be noted that the operating system of the computer can execute and complete some or all the actual operations by executing the program codes read by the computer or by executing the instructions based on the program codes, therefore realizing the functions of any embodiment of the above embodiments.

Moreover, it should be understood that the program codes read out from the storage media are written in memories of expansion boards inserted in the computer, or are written in memories provided in expansion units connected to the computer, and then the instructions based on the program codes can enable the CPUs mounted on the expansion boards or the expansion units to execute and perform some or all the actual operations, therefore realizing the functions of any embodiment of the above embodiments.

While the present disclosure has been described with reference to particular embodiments, it will be understood that the embodiments are illustrative and that the invention scope is not so limited. Alternative embodiments of the present invention will become apparent to those having ordinary skill in the art to which the present invention pertains. Such alternate embodiments are considered to be encompassed within the spirit and scope of the present disclosure. Accordingly, the scope of the present invention is described by the appended claims and is supported by the foregoing description.

What is claimed is:

1. A method for adding hyperlinks to hyperlink words in a text, comprising:

creating a hyperlink word list in advance, the hyperlink word list comprising a plurality of hyperlink words;

collecting a variety of texts, and generating a characteristic word list by implementing word segmentation processing for each of the texts, the characteristic word list comprising a plurality of characteristic words;

respectively determining an IDF (inverse document frequency) value for each characteristic word after generating a characteristic word list by implementing word segmentation processing for each of the texts, wherein the IDF value is calculated by following processes: obtaining a quotient by a quantity of the variety of texts collected divided by a quantity of texts appearing the characteristic word, and calculating a logarithm of the quotient;

for each of the characteristic words, computing a co-occurrence frequency between each of the characteristic words and each of the hyperlink words;

considering each text to be added a hyperlink as a text X, and processing the text X by following steps:

carrying out the word segmentation processing to the text X, and obtaining a segmentation result;

extracting the hyperlink words occurred in the hyperlink word list and the characteristic words occurred in the characteristic word list from the segmentation result;

computing a weight of each of the hyperlink words that are occurred in the hyperlink word list, and computing a weight of each of the characteristic words that are occurred in the characteristic word list, which comprises:

for each hyperlink word H, calculating the weight WH of the hyperlink word H:

$$WH=TFH*IDFH;$$

wherein, TFH represents TF (term frequency) value of the hyperlink word H and TFH refers to the quantity of the hyperlink word H appearing in the text X, and IDFH represents IDF value of the hyperlink word H;

for each characteristic word F, calculating the weight WH of the characteristic word F:

$$WF=TFF*IDFF;$$

wherein, TFF represents TF value of the characteristic word F, and IDFF represents IDF value of the characteristic word F;

determining a final weight of each of the hyperlink words according to each co-occurrence frequency and the weights of the hyperlink words;

descendingly sorting the hyperlink words occurred in the hyperlink word list according to the final weights of the hyperlink words, and obtaining K numbers of hyperlink words that are arranged in first; and adding hyperlinks to the K numbers of hyperlink words, wherein K is a positive integer.

2. The method according to claim 1, the step of generating a characteristic word list by implementing word segmentation processing for each of the texts, comprising:

extracting all unrepeated words obtained by the word segmentation processing as the characteristic words; or removing high-frequency words, stop words and low-frequency words from all the unrepeated words obtained by the word segmentation processing, and considering remaining words as the characteristic words.

3. The method according to claim 1, the step of for each of the characteristic words, computing a co-occurrence frequency between each of the characteristic words and each of the hyperlink words, comprising:

for each characteristic word y and each hyperlink word x, calculating the co-occurrence frequency P(x/y) using a formula of:

$$P(x/y)=\text{a quantity of } xy \text{ co-occurrences/a quantity of } y \text{ occurrences};$$

wherein, the quantity of xy co-occurrences represents the number of texts appearing the characteristic words y and the hyperlink words x in the same time; the quantity of y occurrences represents the number of texts appearing the characteristic words y;

or, for each characteristic word y and each hyperlink word x, calculating the co-occurrence frequency P(x/y) using a formula of:

$$P(x/y)=H(x,y)/I(x,y)=H(x,y)/(H(x)+H(y)-H(x,y));$$

wherein, H represents information entropy, I represents mutual information.

4. The method according to claim 1, the step of determining a final weight of each of the hyperlink words according to each co-occurrence frequency and the weights of the hyperlink words, comprising:

for each hyperlink word H, calculating the final weight WH' of the hyperlink word H:

$$W_{H'} = W_H * \sum_{i=1}^{n} P(H/F_i) * W_{Fi};$$

wherein, n represents a quantity of the characteristic words.

5. A device for adding hyperlinks to hyperlink words in a text, comprising:

a preprocessing module, configured to create a hyperlink word list in advance, collect a variety of texts, generate a characteristic word list by implementing word segmentation processing for each of the texts, and for each of the characteristic words computer a co-occurrence frequency between each characteristic word list and each hyperlink word, wherein the hyperlink word list comprising a plurality of hyperlink words and the characteristic word list comprising a plurality of characteristic words;

the preprocessing module, further configured to respectively determine an inverse document frequency (IDF) value for each characteristic word, wherein the IDF value is calculated by obtaining a quotient by a quantity of the variety of texts collected divided by a quantity of texts appearing the characteristic words, and calculating a logarithm of the quotient;

an adding module, configured to consider each text to be added a hyperlink as a text X, and process the text by following steps:

carrying out the word segmentation processing to the text X, and obtaining a segmentation result;

extracting the hyperlink words occurred in the hyperlink word list and the characteristic words occurred in the characteristic word list from the segmentation result;

computing a weight of each of the hyperlink words that are occurred in the hyperlink word list, and computing a weight of each of the characteristic words that are occurred in the characteristic word list;

determining a final weight of each of the hyperlink words according to each co-occurrence frequency and the weights of the hyperlink words;

descendingly sorting the hyperlink words occurred in the hyperlink word list according to the final weights of the hyperlink words, and obtaining K numbers of hyperlink words that are arranged in first; and adding hyperlinks to the K numbers of hyperlink words, wherein, K is a positive integer;

the adding module comprising a processing sub-unit module configured to extract the hyperlink words occurred in the hyperlink word list and the characteristic words occurred in the characteristic word list from the segmentation result; for each hyperlink word H, calculate the weight WH of the hyperlink word H: WH=TFH*IDFH, wherein TFH represents TF (term frequency) value of the hyperlink word H and TFH refers to the quantity of the hyperlink word H appearing in the text X, and IDFH represents IDF value of the hyperlink word H; for each characteristic word F, calculate the weight WH of the extracted characteristic word F: WF=TFF*IDFF; wherein TFF represents TF value of the characteristic word F, and IDFF represents IDF value of the characteristic word F.

6. The device according to claim 5, wherein the preprocessing module, comprises:

a first processing unit, configured to create a hyperlink word list;

a second processing unit, configured to collect a variety of texts, generate a characteristic word list by implementing word segmentation processing for each of the texts, and compute the co-occurrence frequency between each characteristic word and each hyperlink word.

7. The device according to claim 6, wherein the second processing unit comprises:

a first processing sub-unit, configured to collect a variety of texts; and a second processing sub-unit, configured to carry out the word segmentation processing for each of the texts, and extract all unrepeated words obtained by the word segmentation processing as the characteristic words to form a characteristic word list; or, remove high-frequency words, stop words and low-frequency words from all the unrepeated words obtained by the word segmentation processing, and consider remaining words as the characteristic words to form a characteristic word list;

for each characteristic word y and each hyperlink word x, calculating the co-occurrence frequency P(x/y) using a formula of: P(x/y)=a quantity of xy co-occurrences/a quantity of y occurrences; wherein, the quantity of xy co-occurrences represents the number of texts appearing the characteristic words y and the hyperlink words x in the same time; the quantity of y occurrences represents the number of texts appearing the characteristic words y;

or, for each characteristic word y and each hyperlink word x, calculating the co-occurrence frequency P(x/y) using a formula of: P(x/y)=H(x,y)/I(x,y)=H(x,y)/(H(x)+H(y)−H(x,y)), wherein, H represents information entropy; I represents mutual information.

8. The device according to claim 7, wherein the adding module comprises:
a third processing unit, configured to carry out the word segmentation processing to the text X and obtain a segmentation result; and
a fourth processing unit, configured to extract the hyperlink words occurred in the hyperlink word list and the characteristic words occurred in the characteristic word list from the segmentation result, compute a weight of each of the hyperlink words that are occurred in the hyperlink word list, and compute a weight of each of the characteristic words that are occurred in the characteristic word list, and determine the final weight of each of the hyperlink word according to each co-occurrence frequency and the weights of the hyperlink words; and
a fifth processing unit, configured to descendingly sort the hyperlink words occurred in the hyperlink word list according to the final weights of the hyperlink words, and obtain K numbers of hyperlink words that are arranged in first, and add hyperlinks to the K numbers of hyperlink words, wherein, K is a positive integer.

9. The device according to claim 8, wherein the fourth processing unit comprises:
a fourth processing sub-unit, configured to, for each hyperlink word H, calculate the final weight WH' of the hyperlink word H:

$$W_{H'} = W_H * \sum_{i=1}^{n} P(H/F_i) * W_{Fi};$$

wherein, n represents a quantity of the characteristic words.

10. A non-transitory computer readable storage medium, storing one or more programs for execution by one or more processors of a computer having a display, the one or more programs comprising instructions for:
creating a hyperlink word list in advance, the hyperlink word list comprising a plurality of hyperlink words;
collecting a variety of texts, and generating a characteristic word list by implementing word segmentation processing for each of the texts, the characteristic word list comprising a plurality of characteristic words;
respectively determining an IDF (inverse document frequency) value for each characteristic word after generating a characteristic word list by implementing word segmentation processing for each of the texts, wherein the IDF value is calculated by following processes: obtaining a quotient by a quantity of the variety of texts collected divided by a quantity of texts appearing the characteristic word, and calculating a logarithm of the quotient;
for each of the characteristic words, computing a co-occurrence frequency between each of the characteristic words and each of the hyperlink words;
considering each text to be added a hyperlink as a text X, and processing the text X by following steps:
carrying out the word segmentation processing to the text X, and obtaining a segmentation result;
extracting the hyperlink words occurred in the hyperlink word list and the characteristic words occurred in the characteristic word list from the segmentation result;
computing a weight of each of the hyperlink words that are occurred in the hyperlink word list, and computing a weight of each of the characteristic words that are occurred in the characteristic word list, which comprises:
for each hyperlink word H, calculating the weight WH of the hyperlink word H:

$$WH=TFH*IDFH;$$

wherein, TFH represents TF (term frequency) value of the hyperlink word H and TFH refers to the quantity of the hyperlink word H appearing in the text X, and IDFH represents IDF value of the hyperlink word H;
for each characteristic word F, calculating the weight WH of the characteristic word F:

$$WF=TFF*IDFF;$$

wherein, TFF represents TF value of the characteristic word F, and IDFF represents IDF value of the characteristic word F;
determining a final weight of each of the hyperlink words according to each co-occurrence frequency and the weights of the hyperlink words;
descendingly sorting the hyperlink words occurred in the hyperlink word list according to the final weights of the hyperlink words, and obtaining K numbers of hyperlink words that are arranged in first; and
adding hyperlinks to the K numbers of hyperlink words, wherein K is a positive integer.

* * * * *